Dec. 29, 1925.
E. H. FAHRNEY
CHAIN DRIVE
Filed July 21, 1922
1,567,494
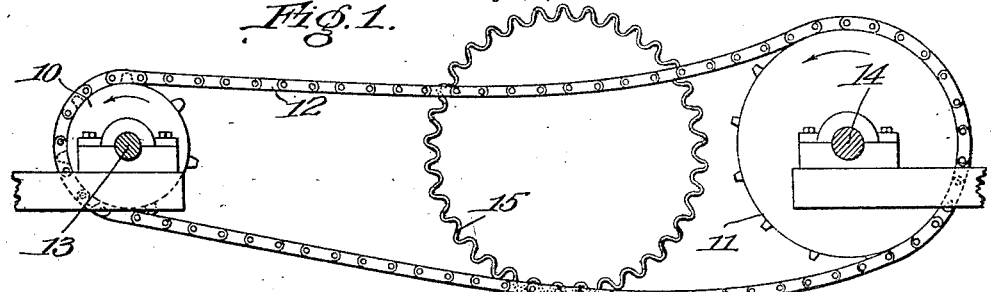
Fig. 1.
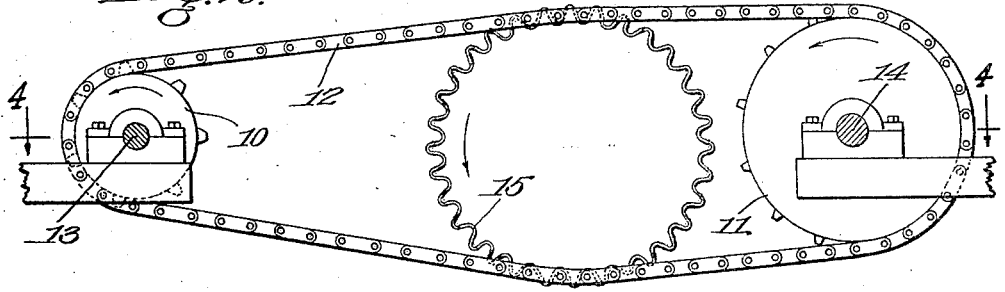
Fig. 2.
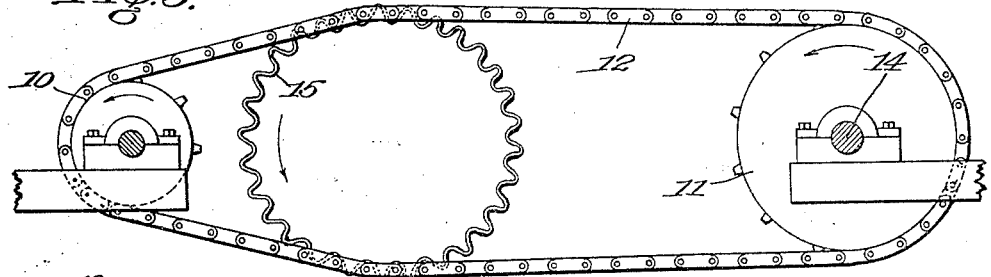
Fig. 3.
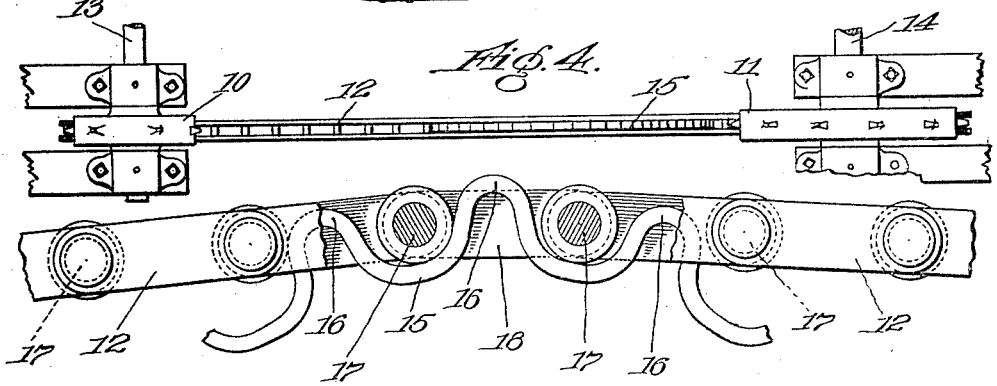
Fig. 4.
Fig. 5.
Inventor:
Emery H. Fahrney
By G. R. Gehrandt
his Attorney Patented Dec. 29, 1925.

1,567,494

UNITED STATES PATENT OFFICE.

EMERY H. FAHRNEY, OF CHICAGO, ILLINOIS.

CHAIN DRIVE.

Application filed July 21, 1922. Serial No. 576,568.

*To all whom it may concern:*

Be it known that I, EMERY H. FAHRNEY, a citizen of the United States, residing at Chicago, in the county of Cook and State of Illinois, have invented certain new and useful Improvements in Chain Drives, of which the following is a specification.

Heretofore considerable difficulty and inconvenience has been experienced with chain drives, especially when endless chains are passed over and co-operate with spaced sprocket wheels, by reason of the fact that due to wear or other conditions, the runs of the chain between the sprockets will become slack and will sag and the connecting pins or rollers between the links will not accurately fit or be properly positioned over the teeth of the sprockets, with the further result that the chain is subjected to sudden jerks or strains which oftentimes results in considerable injury not only to the chain but also to the other parts of the mechanism.

Various tightening devices have heretofore been employed for tightening or taking up the slack in such chains, but these devices necessitate considerable attention and frequent adjustment, some of which adjustments necessitate the variation of the distance between the axes of the driving and driven sprockets, and others require a supporting structure to which the tightening device is secured.

To overcome all of these difficulties and objections and to provide an improved means which is supported entirely by the runs of the chain and which operates automatically to take up the slack or tension of the chain and thereby maintain the chain taut, and which will compensate the wear between the parts, with the result that the connecting pins between the links of the chain will properly fit over and engage the teeth of the sprocket wheels, thereby obviating sudden jerks, strains and whipping of the runs of the chain, is one of the objects of the present invention.

A further object is to provide an improved device of this character adapted to be placed between the runs of the chain so as to automatically and simultaneously operate upon both of the runs of the chain.

A further object is to provide an improved device of this character which will be simple, durable and cheap in construction, and effective and efficient in operation, and which may be readily applied between the runs of the chain at any point throughout the length of the chain between the sprocket wheels, and will be maintained in the position in which it has been put, by the operation of the chain runs, the said runs operating upon the said device in opposition to each other.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which—

Figure 1 is a diagrammatic view of a chain drive with its associated sprockets, and showing the sag which will occur in the chain under ordinary conditions.

Figure 2 is a view similar to Figure 1 showing this improved attachment applied between the runs of the chain and adjacent one of the sprocket wheels.

Figure 3 is a view similar to Figure 2 showing the device as applied between the runs of a chain and adjacent the other sprocket wheel.

Figure 4 is a horizontal sectional view as taken on line 4—4, Figure 2.

Figure 5 is an enlarged detail view of a portion of a sprocket chain and a portion of the attachment shown in position with respect to the sprocket chain.

Throughout the specification and claims, the term chain or sprocket chain will be employed to designate the endless flexible element but it is to be understood that this term is not to be considered as a term of limitation but is to be construed broadly to include any flexible driving element.

By the use of the term "floating" as used in the specification and claims in connection with the element 15, is meant that the element is "detached" in that it is not anchored or connected to any fixed support, but is maintained in position solely by the engagement therewith of the runs of the chain.

Referring more particularly to the drawing the numeral 10 designates a sprocket wheel and 11 another sprocket wheel over which an endless chain driving element 12 passes, the distance between the axes 13 and 14 of the sprockets 10 and 11 being constant.

During the operation of this drive, the chain 12 will, through wear or other conditions sag as shown in Figure 1 so that the links of the chain will not properly pass over the teeth of the sprocket wheels with the result that the chain is subjected to a jerking action which is detrimental to the parts. If the sprocket chain can be maintained taut or the tension of the chain be taken up, the links of the chain will always properly fit over the teeth of the sprocket wheels and these objections will be overcome. In the present invention this result is accomplished by means of an element designated generally by the reference numeral 15, and which element is preferably constructed of a band of resilient material such as steel or the like, shaped to form an annular member. The band is also shaped to form spaced peripheral teeth 16, which are adapted to pass between the connecting pins or rollers 17 of the links 18 of the drive chain.

The element 15 is of a diameter somewhat greater than the distance between the runs of the chain 12 when the latter are held taut or the slack therein taken up, so that when the element 15 is placed in position between the runs of the chain, the element will be slightly compressed so as to place the same under tension and will cause the element to assume a slightly ellipse shape.

The teeth 16 of the element 15 simultaneously engage between the links of each of the runs of the chain and by reason of this fact and by reason of the fact that the element 15 is rotated by the simultaneous operation thereupon of both of the runs of the chain 12, and in opposition to each other, the element 15 will be given a rotary movement but will be maintained in the position to which it has been initially placed. This element is supported entirely by and between the runs of the chain.

In Figure 2 the element 15 is shown as being disposed in close proximity to the sprocket wheel 11, while in Figure 3 the element is shown as being disposed in close proximity to the sprocket wheel 10, but the element may be located at any desired or suitable point intermediate the sprocket wheels 10 and 11.

It will therefore be manifest that with this improved invention, the slack or tension of the chain will be taken up by the resiliency of the element 15, while the distance between the axes 13—14 of the sprocket wheels 10 and 11 will remain constant.

While the preferred form of the invention has been herein shown and described, it is to be understood that various changes may be made in the details of construction thereof and therefore it is desired that the drawings herewith submitted shall be construed as being merely diagrammatic.

What is claimed as new is:—

1. In combination, a flexible driving element, and a floating annular element having inherent resiliency, said floating element engaging with the driving element for maintaining the latter taut.

2. In combination, a flexible driving element, and a floating element engaging therewith and supported thereby for maintaining the said driving element taut, said floating element having inherent resiliency.

3. In combination, a flexible driving element embodying spaced runs traveling in opposite directions, and a floating element supported between and simultaneously engaging the runs for maintaining them taut, said floating element having inherent resiliency, the said runs acting upon the said elements in opposition to each other.

4. In combination a driving element embodying spaced linked runs, and a toothed resilient element supported by and between the said runs for maintaining them taut.

5. In combination a driving element embodying spaced linked runs, and a floating toothed resilient element supported by and between the said runs for maintaining them taut.

6. In combination a driving element embodying spaced linked runs, and an annular toothed floating resilient element supported by and between the said runs for maintaining them taut.

7. In combination, spaced sprocket wheels, an endless drive chain passing thereover, and a toothed resilient floating element supported by and between the said runs for maintaining them taut, the said runs simultaneously acting upon the said element in opposition to each other.

8. In combination, spaced sprocket wheels, an endless drive chain passing thereover, and a toothed resilient floating element supported by and between the said runs for maintaining them taut, the said runs simultaneously acting upon the said element in opposition to each other, the position of the said element between the said sprockets being adapted to be varied while the position of the axes of the sprocket with respect to each other remains constant.

9. In combination, an endless drive chain, and an annular resilient element shaped to form peripheral teeth, said element being disposed between and supported by the runs of the chain for maintaining them taut, the teeth of said element simultaneously engaging in the links of both runs of the said chain.

10. As an article of manufacture, a device for maintaining the runs of drive chains taut, said device embodying a detached floating element having inherent resiliency.

11. As an article of manufacture, a device for maintaining the runs of drive chains taut, said device embodying a floating toothed element, said element having inherent resiliency.

12. As an article of manufacture, a device for maintaining the runs of drive chains taut, said device embodying a floating annular element, said element having inherent resiliency.

13. As an article of manufacture, a device for maintaining the runs of drive chains taut, said device embodying a floating annular toothed element, said element having inherent resiliency.

14. As an article of manufacture, a device for maintaining the runs of drive chains taut, said device embodying an annular element formed of resilient material, the body of the element being shaped to form peripheral teeth.

In testimony whereof I have hereunto signed my name to this specification, on this 15th day of July, 1922.

EMERY H. FAHRNEY.